United States Patent
Park et al.

(10) Patent No.: US 10,720,661 B2
(45) Date of Patent: Jul. 21, 2020

(54) MANDREL FOR SPIRAL-WINDING ELECTRODE

(71) Applicant: SAMSUNG SDI CO., LTD., Yongin-si, Gyeonggi-do (KR)

(72) Inventors: Jung-Hyun Park, Yongin-si (KR); Jae-Yub Kwon, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 746 days.

(21) Appl. No.: 14/866,604

(22) Filed: Sep. 25, 2015

(65) Prior Publication Data

US 2016/0141710 A1 May 19, 2016

(30) Foreign Application Priority Data

Nov. 13, 2014 (KR) .................. 10-2014-0158192

(51) Int. Cl.
| | | |
|---|---|---|
| *H01M 4/00* | (2006.01) | |
| *H01M 6/10* | (2006.01) | |
| *H01M 10/10* | (2006.01) | |
| *H01M 6/00* | (2006.01) | |
| *H01M 2/16* | (2006.01) | |
| *H01M 2/18* | (2006.01) | |
| *H01M 10/04* | (2006.01) | |

(52) U.S. Cl.
CPC .... *H01M 10/0431* (2013.01); *H01M 2220/30* (2013.01)

(58) Field of Classification Search
None
See application file for complete search history.

(56) References Cited

U.S. PATENT DOCUMENTS 4,121,019 A * 10/1978 Garrett, Jr. .......... H01M 10/125
    429/186
2007/0180686 A1 * 8/2007 Woo ....................... H01M 4/13
    29/623.1

FOREIGN PATENT DOCUMENTS

| CN | 1219288 A | 6/1999 |
|---|---|---|
| CN | 103811794 A | 5/2014 |
| CN | 104009259 A | 8/2014 |
| JP | 2000-82485 A | 3/2000 |

(Continued)

OTHER PUBLICATIONS

Machine translation of CN 104009259, Samsung SDI, Aug. 27, 2014, pp. 1-14.*

(Continued)

*Primary Examiner* — Cynthia H Kelly
*Assistant Examiner* — Julian Anthony
(74) *Attorney, Agent, or Firm* — Lewis Roca Rothgerber Christie LLP

(57) ABSTRACT

A mandrel that can uniformly form a thickness of an electrode assembly and minimize deformation of an electrode plate upon swelling. The mandrel that is configured to wind an electrode of a rechargeable battery includes: a first reel and a second reel with a gap therebetween, wherein the first reel includes a gap surface facing the second reel, a first front surface and a second front surface that are connected by the gap surface, and a first inclined surface and a second inclined surface that connect the first front surface and the second front surface, wherein the first inclined surface is longer than the second inclined surface.

14 Claims, 4 Drawing Sheets

(56) References Cited

FOREIGN PATENT DOCUMENTS

| | | |
|---|---|---|
| KR | 10-2005-0085886 A | 8/2005 |
| KR | 10-2007-0013565 A | 1/2007 |

OTHER PUBLICATIONS

Chinese Office Action, with English translation, dated Nov. 2, 2018, for corresponding Chinese Patent Application No. 201510745250.2 (14 pages).
Chinese Second Office Action with English Translation for corresponding Chinese Patent Application No. 201510745250.2, dated May 10, 2019, 16 pages.
Malaysia Intellectual Property Office Action and Search Report for corresponding Malaysian Application No. PI 2015703922, dated Jun. 25, 2019, 4 pages.

* cited by examiner

MANDREL FOR SPIRAL-WINDING ELECTRODE

CROSS-REFERENCE TO RELATED APPLICATION

This application claims priority to and the benefit of Korean Patent Application No. 10-2014-0158192 filed in the Korean Intellectual Property Office on Nov. 13, 2014, the entire contents of which are incorporated herein by reference.

BACKGROUND

1. Field

The present invention relates to a mandrel for spiral-winding an electrode of a rechargeable battery.

2. Description of the Related Art

With the development of IT technology, various mobile devices such as smart phones and tablet personal computers (PC) are rapidly released to the market. To improve design and convenience, such devices have become increasingly thinner. In these thinner devices, battery thickness precision is important.

A rechargeable battery, such as a lithium secondary battery, typically includes a pair of electrode plates that are wound (i.e., an electrode assembly) and an electrolyte inside a case. In a rechargeable battery, repeated charge and discharge of the battery may cause swelling inside the battery, wherein the thickness of the battery increases. This swelling may be caused by the generation of a lithium compound within the battery, which can result in growth of an electrode/electrolyte interface layer. If a gap between the electrode plates in the lithium secondary battery is too small, when the electrode expands, the electrode plate may unevenly deform.

Further, when the gap between the electrode plates is too small, the side of the electrode plate may bend, resulting in a non-uniform thickness of the electrode assembly. A battery having a relatively large width and a relatively small thickness has recently been developed. However, in a battery having a small thickness, there is not a sufficient buffer space between electrodes, making it difficult to form or maintain a uniform thickness.

The above information disclosed in this Background section is only for enhancement of understanding of the background of the invention and therefore it may contain information that does not form the prior art that is already known in this country to a person of ordinary skill in the art.

SUMMARY

Embodiments of the present invention are directed to a mandrel capable of uniformly forming a thickness of an electrode assembly and minimizing deformation of an electrode plate upon swelling.

One or more embodiments of the present invention are directed to a mandrel that is configured to wind an electrode of a rechargeable battery, including: a first reel and a second reel with a gap therebetween, wherein the first reel includes a gap surface facing the second reel, a first front surface and a second front surface that are connected by the gap surface, and a first inclined surface and a second inclined surface that together connect the first front surface and the second front surface, and wherein the first inclined surface is longer than the second inclined surface. A ratio of the lengths of the first inclined surface and the second inclined surface may be between about 1.1 and about 1.5.

The first inclined surface may be connected to the first front surface and the second inclined surface may be connected to the second front surface. A ratio of a tilt angle between the first inclined surface and the first front surface and a tilt angle between the second inclined surface and the second front surface may be between about 0.95 and about 0.7. The first inclined surface and the first front surface may meet a corner that is arc-shaped.

The first inclined surface and the second inclined surface may extend in a length direction and in a depth direction perpendicular to the length direction. A ratio between a distance corresponding to the depth of the first inclined surface extending in the depth direction and a distance corresponding to the depth of the second inclined surface extending in the depth direction may be between about 1.5 and about 4.

A ratio between a thickness of the mandrel in millimeters and an angle between the first inclined surface and the second inclined surface in degrees may be between about 0.25 and about 1.2.

An angle between the first inclined surface and the second inclined surface may be between about 50° and about 70°, and the first front surface and the second front surface may be parallel.

The second reel may include a gap surface facing the first reel, a third front surface and a fourth front surface that are connected by the gap surface, and a third inclined surface and a fourth inclined surface that connect the third front surface and the fourth front surface, wherein the third inclined surface may be longer than the fourth inclined surface. The third inclined surface may be parallel to the first inclined surface, and the fourth inclined surface may be parallel to the second inclined surface.

DETAILED DESCRIPTION

Figure 1:
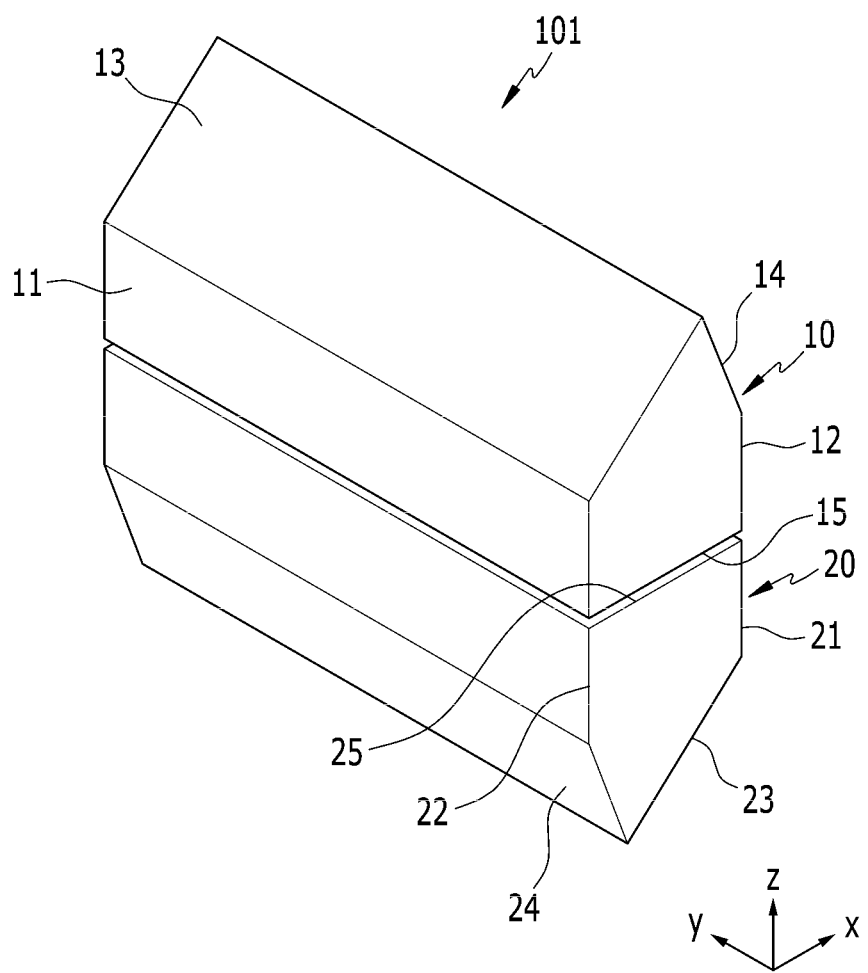
FIG. 1 is a perspective view illustrating a mandrel for spiral-winding an electrode according to one or more embodiments of the present invention.

Hereinafter, exemplary embodiments of the present invention are described with reference to the attached drawings such that the present invention can be easily put into practice by those skilled in the art. As those skilled in the art would realize, the described embodiments may be modified in various different ways, all without departing from the spirit or scope of the present invention. Like reference numerals designate like elements throughout the specification and the drawings.

Figure 2:
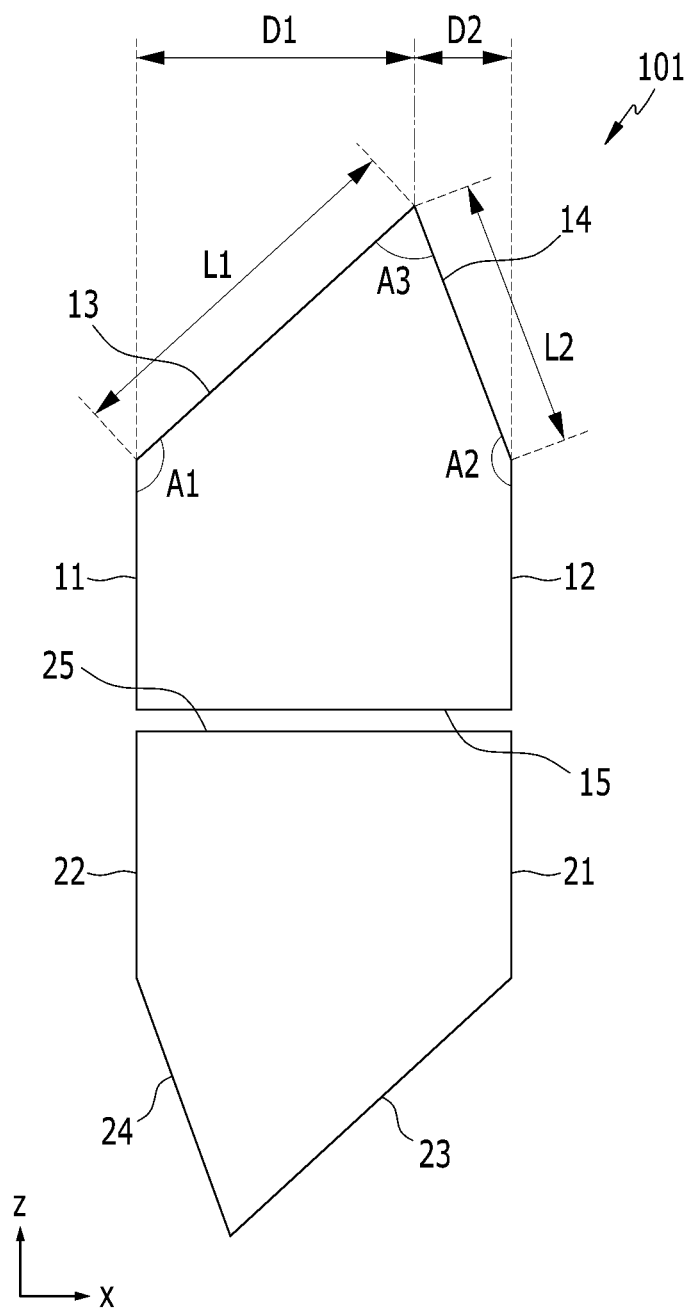
FIG. 2 is a longitudinal cross-sectional view illustrating the mandrel for spiral-winding an electrode of FIG. 1.

FIG. 1 is a perspective view illustrating a mandrel for spiral-winding an electrode according to one or more embodiments of the present invention, and FIG. 2 is a longitudinal cross-sectional view illustrating the mandrel according to FIG. 1.

Referring to FIGS. 1 and 2, a mandrel 101 according to one or more embodiments of the present invention includes a first reel 10 and a second reel 20. The first reel 10 and the second reel 20 are separately disposed with a gap therebetween, and an end portion of an electrode plate is inserted between the first reel 10 and the second reel 20. When a positive electrode, a negative electrode, and a separator are interposed (or inserted) between the first reel 10 and the second reel 20, the first reel 10 and the second reel 20 may then be rotated (or wound) together (or simultaneously), forming a wound electrode plate at an outer surface of the mandrel 101.

The first reel 10 includes a gap surface 15 that faces the second reel 20 and extends in a width direction Y and a depth direction X perpendicular to the width direction Y, a first front surface 11 and a second front surface 12 that are connected by the gap surface 15 and extend in the width direction and a length direction Z perpendicular to the depth direction X and the width direction Y, and a first inclined surface 13 and second inclined surface 14 that connect the first front surface 11 and the second front surface 12 and extend in the width direction Y, the depth direction X, and the length direction Z. The vertical cross-section of the first reel 10 is generally pentagon-shaped, and the gap surface 15, the first front surface 11, the first inclined surface 13, the second inclined surface 14, and the second front surface 12 are sequentially connected to form a pentagon (i.e., the first front surface 11 extends from the gap surface 15 and toward the first inclined surface 13, the first inclined surface 13 extends from the first front surface 11 and toward the second inclined surface 14, the second inclined surface 14 extends from the first inclined surface 13 and toward the second front surface 12, the second front surface 12 extends from the second inclined surface 14 and toward the gap surface 15, and the gap surface 15 extends from the second front surface 12 toward the first front surface 11).

The gap surface 15, the first front surface 11, the first inclined surface 13, the second inclined surface 14, and the second front surface 12 form a plurality of rectangles extending in the width direction Y. The gap surface 15, the first front surface 11, the first inclined surface 13, the second inclined surface 14, and the second front surface 12 have the same width (i.e., uniformly extend in the width direction Y).

The first front surface 11 and the second front surface 12 are parallel and have the same length in the length direction Z. The first inclined surface 13 and the second inclined surface 14 connect the first front surface 11 and the second front surface 12. The first inclined surface 13 is connected to the first front surface 11, and the second inclined surface 14 is connected to the second front surface 12.

The first inclined surface 13 has a greater length, extending in the length direction Z and the depth direction X, than the second inclined surface 14. A ratio of the length L1 of the first inclined surface 13 to the length L2 of the second inclined surface 14 is between about 1.1 and about 1.5. As such, because the first inclined surface 13 is formed longer than the second inclined surface 14, the sides of the mandrel 101 are asymmetrical, which creates a difference in the length of the electrode assembly during winding and may create a corresponding increased gap between the electrode plates.

A tilt angle A1 between the first front surface 11 and the first inclined surface 13 is smaller than a tilt angle A2 between the second front surface 12 and the second inclined surface 14. A ratio of the tilt angle A1 to the tilt angle A2 may be between about 0.95 and about 0.7. As such, because the first inclined surface 13 and the second inclined surface 14 have different slopes in the length direction Z, the surfaces of both sides of the electrode assembly are asymmetrically wound and may create a corresponding increased gap between the electrode plates.

As discussed above, the first inclined surface 13 and the second inclined surface 14 extend in the length direction Z and the depth direction X. A distance D1 corresponding to the length the first inclined surface 13 extends in the depth direction X is longer than a distance D2 corresponding to the length the second inclined surface 14 extends in the depth direction X. A ratio of the distance D1 to the distance D2 may be between about 1.5 and about 4. Accordingly, a corner at which the first inclined surface 13 and the second inclined surface 14 meet is closer to the second front surface 12 than the first front surface 11 (in the depth direction X).

In addition, a ratio between a thickness of the first reel 10 (i.e., a length of the first reel 10 extending in the depth direction X or D1+D2) in millimeters (mm) and an angle A3 between the first inclined surface 13 and the second inclined surface 14 in degrees may be between about 0.25 and about 1.2. Further, the angle A3 between the first inclined surface 13 and the second inclined surface 14 may be between about 50° and about 70°.

The second reel 20 and the first reel 10 have symmetrical structures, with the second reel 20 rotated 180 degrees relative to the first reel 10. The second reel 20 includes a gap surface 25 that faces the first reel 10 and extends in the width direction Y and the depth direction X, a third front surface 21 and a fourth front surface 22 that are connected by the gap surface 25 and extend in the width direction Y and the length direction Z, and a third inclined surface 23 and a fourth inclined surface 24 that connect the third front surface 21 and the fourth front surface 22 and extend in the width direction Y, the depth direction X, and the length direction Z.

The gap surface 25 of the second reel 20 is parallel to the gap surface 15 of the first reel 10, and electrode plates are inserted between the gap surfaces 15, 25. The third inclined surface 23 is parallel to the first inclined surface 13, and the fourth inclined surface 24 is parallel to the second inclined surface 14. The third front surface 21 and the fourth front surface 22 are also in parallel.

The gap surface 25, the third front surface 21, the third inclined surface 23, the fourth inclined surface 24, and the fourth front surface 22 form a plurality of rectangles extending in the width direction Y. The vertical cross-section of the second reel 20 is generally pentagon-shaped, and the gap surface 25, the third front surface 21, the third inclined surface 23, the fourth inclined surface 24, and the fourth front surface 22 are connected to form a pentagon (i.e., the third front surface 21 extends from the gap surface 25 and toward the third inclined surface 23, the third inclined surface 23 extends from the third front surface 21 and toward the fourth inclined surface 24, the fourth inclined surface 24 extends from the third inclined surface 23 and toward the fourth front surface 22, the fourth front surface 22 extends from the fourth inclined surface 24 and toward the gap surface 25, and the gap surface 25 extends from the fourth front surface 22 toward the third front surface 21). Further, the third inclined surface 23 is formed longer than the fourth inclined surface 24, and a ratio of the length of the third inclined surface 23 to the length of the fourth inclined surface 24 may be between about 1.1 and about 1.5.

As such, because the inclined surfaces of the first reel 10 and the second reel 20 are formed asymmetrically, the length of the electrode assembly varies as it is wound, allowing for a larger gap between the electrode plates. Accordingly, even upon swelling inside the battery, bending or deformation of the electrode plate at the side end of the electrode assembly can be prevented (or minimized) and a uniform thickness of the electrode assembly may be maintained.

Figure 3:
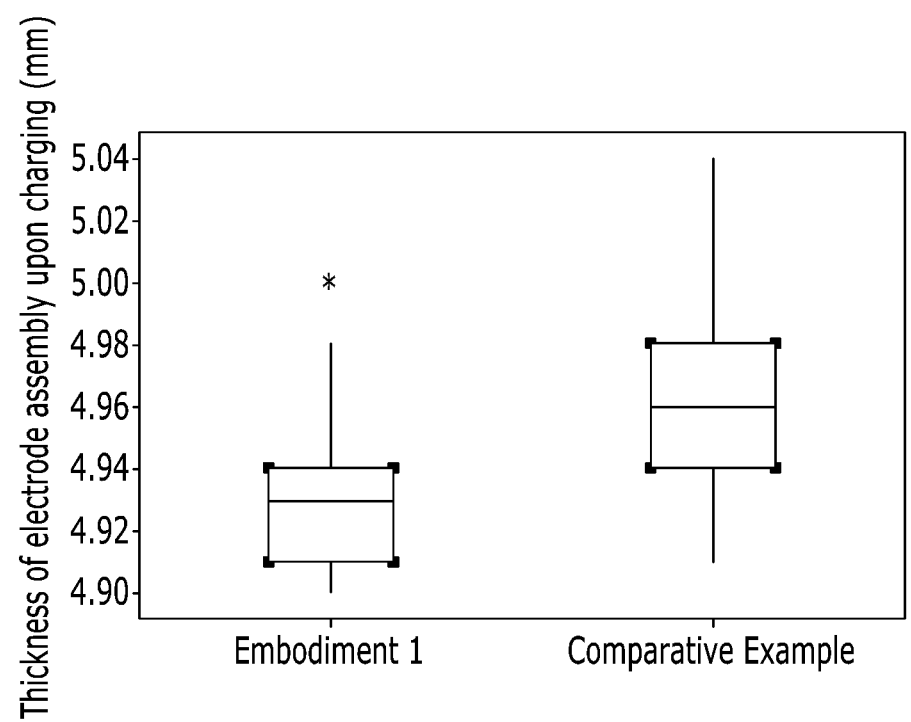
FIG. 3 is a graph illustrating comparative thickness distributions of an electrode assembly after charging of an electrode assembly wound by a mandrel according to an embodiment of the present invention and of an electrode assembly wound by a symmetrical mandrel.

FIG. 3 shows the thickness distribution during charging of an electrode assembly that is spiral-wound by a mandrel according to one or more embodiments of the present invention and of an electrode assembly that is spiral-wound by a symmetrical mandrel. As shown in FIG. 3, the distribution of thicknesses (both spread and actual thicknesses measured) of the electrode assembly that is spiral-wound by the mandrel according to one or more embodiments of the present invention is generally smaller than the distribution of thicknesses (both spread and actual thicknesses measured) of the electrode assembly that is spiral-wound by the symmetrical mandrel.

Figure 4:
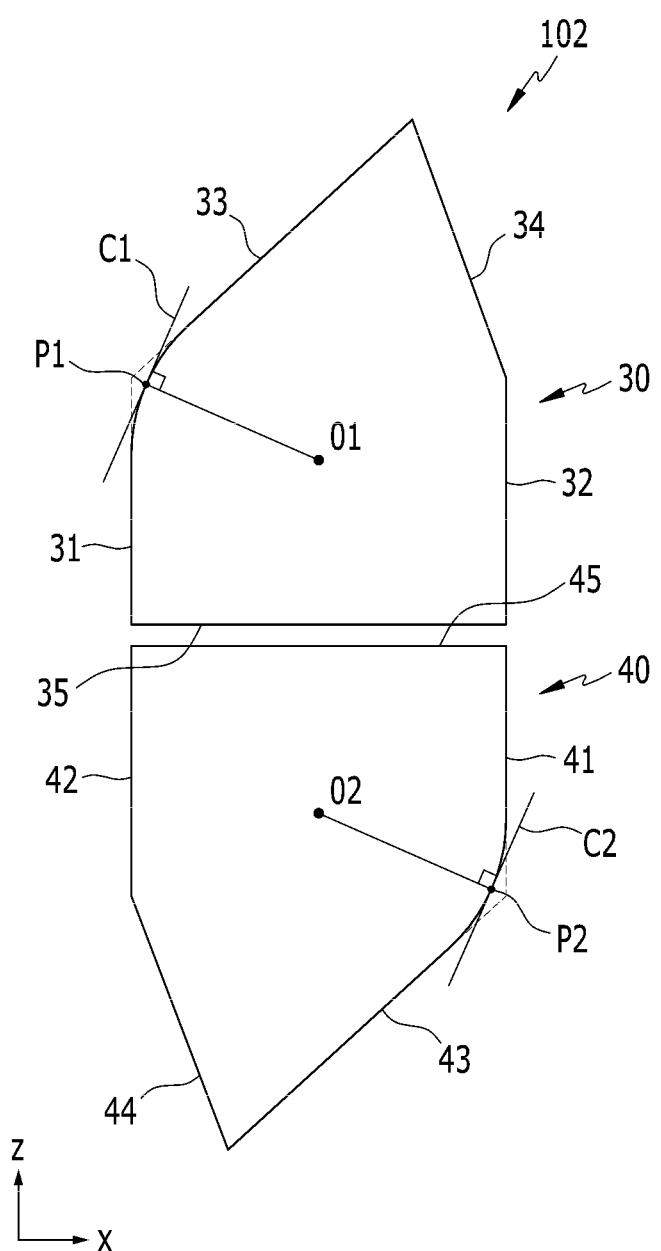
FIG. 4 is a longitudinal cross-sectional view illustrating a mandrel for spiral-winding an electrode according to one or more embodiments of the present invention.

FIG. 4 is a longitudinal cross-sectional view illustrating a mandrel for spiral-winding an electrode according to one or more embodiments of the present invention.

Referring to FIG. 4, a mandrel 102 for spiral-winding an electrode includes a first reel 30 and a second reel 40.

The first reel 30 and the second reel 40 are separately disposed with a gap therebetween, and an end portion of an electrode plate may be inserted between the first reel 30 and the second reel 40.

The first reel 30 includes a gap surface 35 that faces the second reel 40 and extends in a width direction and a depth direction perpendicular to the width direction, a first front surface 31 and a second front surface 32 that are connected by the gap surface 35 and extend in the width direction and a length direction perpendicular to the width direction and the depth direction, and a first inclined surface 33 and a second inclined surface 34 that connect the first front surface 31 and the second front surface 32 and extend in the width direction, the depth direction, and the length direction. The gap surface 35, the first front surface 31, the first inclined surface 33, the second inclined surface 34, and the second front surface 32 form a plurality of rectangles extending in the width direction. The gap surface 35, the first front surface 31, the first inclined surface 33, the second inclined surface 34, and the second front surface 32 have the same width (i.e., uniformly extend in the width direction).

The first front surface 31 and the second front surface 32 are parallel and have the same length in the length direction. The first inclined surface 33 is connected to the first front surface 31 and the second inclined surface 34 is connected to the second front surface 32. The first inclined surface 33 has a greater length, extending in the length direction and the depth direction, than the second inclined surface 34. A ratio of the length of the first inclined surface 33 to the length of the second inclined surface 34 is between about 1.1 and about 1.5.

The first front surface 31 and the first inclined surface 33 meet at a contact point P1 and form a corner that is generally arc-shaped. The contact point P1 rests on a tangent line C1 that is tangent to the arc-shaped corner. As shown in FIG. 4, a line projected from the center O1 of the first reel 30 to the contact point P1 and the tangent line C1 are perpendicular.

As such, in embodiments wherein the first front surface 31 and the first inclined surface 33 meet at a corner that is arc-shaped, the length of the first inclined surface 33 may be longer in the length direction Z than when the corner is not rounded or arc-shaped.

The second reel 40 and the first reel 30 have symmetrical structure, with the second reel 40 rotated 180 degrees relative to the first reel 30. The second reel 40 includes a gap surface 45 that faces the first reel 30 and extends in the width direction and the depth direction, a third front surface 41 and a fourth front surface 42 that are connected by the gap surface 45 and extend in the width direction and the length direction, and a third inclined surface 43 and a fourth inclined surface 44 that connect the third front surface 41 and the fourth front surface 42 and that extend in the width direction, the length direction, and the depth direction.

The gap surface 45 of the second reel 40 is parallel to the gap surface 35 of the first reel 30, and electrode plates are inserted between gap surfaces 35, 45. The third inclined surface 43 is formed parallel to the first inclined surface 33, and the fourth inclined surface 44 is formed parallel to the second inclined surface 34. The third front surface 41 and the fourth front surface 42 are also disposed in parallel.

The third inclined surface 43 is formed longer than the fourth inclined surface 44, and a ratio of the length of the third inclined surface 43 to the length of the fourth inclined surface 44 is between about 1.1 and about 1.5. The third front surface 41 and the third inclined surface 43 meet at a contact point P2 and form a corner that is generally arc-shaped. The contact point P2 rests on a tangent line C2 that is tangent to the arc-shaped corner. As shown in FIG. 4, a line projected from the center O2 of the second reel 40 to the contact point P2 and the tangent line C2 are perpendicular.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

DESCRIPTION OF SYMBOLS IN NON-LIMITING EMBODIMENTS 101, 102: mandrel
10, 30: first spiral-wound reel
11, 31: first front surface
12, 32: second front surface
13, 33: first inclined surface
14, 34: second inclined surface
15, 25, 35, 45: gap surface
20, 40: second spiral-wound reel
21, 41: third front surface
22, 42: fourth front surface
23, 43: third inclined surface
24, 44: fourth inclined surface

What is claimed is:

1. A mandrel configured to wind an electrode of a rechargeable battery, the mandrel comprising:
    a first reel; and
    a second reel spaced from the first reel by a gap,
    wherein the first reel comprises a gap surface facing the second reel, a first front surface and a second front surface that are connected by the gap surface, and a first inclined surface and a second inclined surface that connect the first front surface and the second front surface,
    wherein the first inclined surface is longer than the second inclined surface, wherein a first angle between the first inclined surface and the second inclined surface is less than a second angle between the second inclined surface and the second front surface, and wherein the first inclined surface and the second inclined surface are substantially flat.

2. The mandrel of claim 1, wherein a ratio of a length of the first inclined surface to a length of the second inclined surface is between about 1.1 and about 1.5.

3. The mandrel of claim 1, wherein the first inclined surface is connected to the first front surface and the second inclined surface is connected to the second front surface, and wherein a ratio of a tilt angle between the first inclined surface and the first front surface and a tilt angle between the second inclined surface and the second front surface is between about 0.95 and about 0.7.

4. The mandrel of claim 3, wherein the first inclined surface and the first front surface meet at a corner that is arc-shaped.

5. The mandrel of claim 1, wherein the first inclined surface and the second inclined surface extend in a length direction and in a depth direction perpendicular to the length direction, and wherein a ratio between a distance corresponding to a depth of the first inclined surface extending in the depth direction and a distance corresponding to a depth of the second inclined surface extending in the depth direction is between about 1.5 and about 4.

6. The mandrel of claim 1, wherein a ratio between a thickness of the mandrel in mm and the first angle between the first inclined surface and the second inclined surface in degrees is between about 0.25 and about 1.2.

7. The mandrel of claim 6, wherein the first angle between the first inclined surface and the second inclined surface is between about 50° and about 70°.

8. The mandrel of claim 1, wherein the first front surface and the second front surface are parallel.

9. The mandrel of claim 1, wherein the second reel comprises a gap surface facing the first reel, a third front surface and a fourth front surface that are connected by the gap surface, and a third inclined surface and fourth inclined surface that connect the third front surface and the fourth front surface, and wherein the third inclined surface is longer than the fourth inclined surface.

10. The mandrel of claim 9, wherein the third inclined surface is parallel to the first inclined surface, and the fourth inclined surface is parallel to the second inclined surface.

11. The mandrel of claim 1, wherein the first reel has a pentagonal shape.

12. The mandrel of claim 1, wherein the first front surface is substantially flat.

13. The mandrel of claim 1, wherein the second front surface is substantially flat.

14. The mandrel of claim 1, wherein the first front surface and the gap surface form a right angle.

* * * * *